(12) United States Patent
Danilov et al.

(10) Patent No.: US 10,133,770 B2
(45) Date of Patent: Nov. 20, 2018

(54) COPYING GARBAGE COLLECTOR FOR B+ TREES UNDER MULTI-VERSION CONCURRENCY CONTROL

(71) Applicant: EMC Corporation, Hopkinton, MA (US)

(72) Inventors: Mikhail Danilov, Saint Petersburg (RU); Mikhail Malygin, Saint Petersburg (RU); Ivan Tchoub, Saint Petersburg (RU); Chen Wang, Shanghai (CN); Shashwat Srivastav, Seattle, WA (US); Andrey Fomin, Vesevolozhsk (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 247 days.

(21) Appl. No.: 15/193,141

(22) Filed: Jun. 27, 2016

(65) Prior Publication Data

US 2017/0177652 A1  Jun. 22, 2017

(30) Foreign Application Priority Data

Dec. 16, 2015 (RU) ............................... 2015153847

(51) Int. Cl.
    *G06F 17/30* (2006.01)
    *G06F 3/06* (2006.01)

(52) U.S. Cl.
    CPC ........ *G06F 17/30371* (2013.01); *G06F 3/067* (2013.01); *G06F 3/0608* (2013.01); *G06F 3/0652* (2013.01); *G06F 17/30312* (2013.01)

(58) Field of Classification Search
    CPC ......... G06F 17/30371; G06F 17/30312; G06F 3/0608; G06F 3/0652; G06F 3/067
    See application file for complete search history.

(56) References Cited

U.S. PATENT DOCUMENTS

| | | | |
|---|---|---|---|
| 5,519,855 A * | 5/1996 | Neennan | G06F 17/30067 |
| 5,758,347 A | 5/1998 | Lo et al. | |
| 5,987,468 A * | 11/1999 | Singh | G06F 17/30327 |
| 6,070,003 A | 5/2000 | Gove et al. | |
| 6,550,035 B1 | 4/2003 | Okita | |
| 7,069,469 B2 | 6/2006 | Pillutla et al. | |
| 7,549,110 B2 | 6/2009 | Stek et al. | |
| 7,559,007 B1 | 7/2009 | Wilkie | |

(Continued)

OTHER PUBLICATIONS

U.S. Appl. No. 15/620,892, filed Jun. 13, 2017, Danilov et al.

(Continued)

*Primary Examiner* — Jay A Morrison
(74) *Attorney, Agent, or Firm* — Daly, Crowley, Mofford & Durkee, LLP (57) ABSTRACT

Structures and processes for garbage collection of search trees under Multi-Version Concurrency Control (MVCC). Such search trees may be used to store data within a distributed storage system. A process detects live search tree elements using tracing and then identify storage chunks having no live elements as garbage to be reclaimed. The process can be paused and resumed to reduce impact on other system processing. To reduce disk fragmentation, a garbage collector may copy pages between chunks prior to reclaiming chunk capacity. Also described is a resource efficient scheduler for a garbage collection.

18 Claims, 9 Drawing Sheets

(56) References Cited

U.S. PATENT DOCUMENTS

| | | | |
|---|---|---|---|
| 7,581,156 | B2 | 8/2009 | Manasse |
| 7,707,232 | B2 | 4/2010 | Dussud et al. |
| 8,458,515 | B1 | 6/2013 | Saeed |
| 8,532,212 | B2 | 9/2013 | Ito |
| 8,683,296 | B2 | 3/2014 | Anderson et al. |
| 8,683,300 | B2 | 3/2014 | Stek et al. |
| 8,762,642 | B2 | 6/2014 | Bates et al. |
| 8,843,459 | B1 * | 9/2014 | Aston ............... G06F 17/30067 707/694 |
| 8,886,781 | B2 * | 11/2014 | Jain ...................... G06F 3/0611 707/737 |
| 8,914,706 | B2 | 12/2014 | Anderson |
| 9,268,806 | B1 | 2/2016 | Kesselman |
| 2002/0073103 | A1 | 6/2002 | Bottomley et al. |
| 2005/0038968 | A1 | 2/2005 | Iwamura et al. |
| 2005/0071335 | A1 | 3/2005 | Kadatch |
| 2006/0074990 | A1 | 4/2006 | Burka et al. |
| 2006/0105724 | A1 | 5/2006 | Nakao |
| 2006/0147219 | A1 | 7/2006 | Yoshino et al. |
| 2006/0212495 | A1 * | 9/2006 | Tokunaga ......... G06F 17/30339 |
| 2008/0126357 | A1 | 5/2008 | Casanova et al. |
| 2008/0263114 | A1 | 10/2008 | Nath et al. |
| 2009/0112953 | A1 | 4/2009 | Barsness et al. |
| 2010/0076940 | A1 * | 3/2010 | Bordawekar ..... G06F 17/30961 707/704 |
| 2010/0091842 | A1 | 4/2010 | Ikeda et al. |
| 2010/0180176 | A1 | 7/2010 | Yosoku et al. |
| 2010/0198849 | A1 | 8/2010 | Thomas et al. |
| 2010/0246663 | A1 | 9/2010 | Citta et al. |
| 2011/0053639 | A1 | 3/2011 | Etienne Suanez et al. |
| 2011/0055494 | A1 | 3/2011 | Roberts et al. |
| 2011/0196900 | A1 | 8/2011 | Drobychev et al. |
| 2012/0051208 | A1 | 3/2012 | Li et al. |
| 2012/0095970 | A1 | 4/2012 | Shyam et al. |
| 2012/0106595 | A1 | 5/2012 | Bhattad et al. |
| 2013/0067187 | A1 | 3/2013 | Moss et al. |
| 2013/0185337 | A1 | 7/2013 | Lipcon |
| 2013/0282676 | A1 | 10/2013 | Wade et al. |
| 2014/0046997 | A1 | 2/2014 | Dain et al. |
| 2014/0344216 | A1 | 11/2014 | Abercrombie et al. |
| 2016/0098346 | A1 | 4/2016 | Pechanec et al. |
| 2016/0239384 | A1 | 8/2016 | Slik et al. |
| 2016/0378508 | A1 | 12/2016 | Chapman et al. |
| 2017/0004044 | A1 * | 1/2017 | Tormasov et al. ........................... G06F 11/1076 |
| 2017/0046127 | A1 | 2/2017 | Fletcher et al. |
| 2017/0060898 | A1 | 3/2017 | Lu et al. |

OTHER PUBLICATIONS

U.S. Appl. No. 15/620,897, filed Jun. 13, 2017, Danilov et al.
U.S. Appl. No. 15/620,898, filed Jun. 13, 2017, Danilov et al.
U.S. Appl. No. 15/620,900, filed Jun. 13, 2017, Danilov et al.
Response to U.S. Non-Final Office Action dated Nov. 27, 2017 for U.S. Appl. No. 15/186,576; Response filed Feb. 23, 2018; 7 pages.
U.S. Final Office Action dated Mar. 1, 2018 for U.S. Appl. No. 15/193,145; 32 pages.
U.S. Final Office Action dated Mar. 2, 2018 for U.S. Appl. No. 15/193,409; 10 pages.
U.S. Appl. No. 14/929,788, filed Nov. 2, 2015, Kurilov et al.
U.S. Appl. No. 15/083,324, filed Mar. 29, 2016, Danilov et al.
U.S. Appl. No. 15/193,144, filed Jun. 27, 2016, Kurilov et al.
U.S. Appl. No. 15/186,576, filed Jun. 20, 2016, Malygin et al.
U.S. Appl. No. 15/193,145, filed Jun. 27, 2016, Fomin et al.
U.S. Appl. No. 15/193,407, filed Jun. 27, 2016, Danilov et al.
U.S. Appl. No. 15/193,142, filed Jun. 27, 2016, Danilov et al.
U.S. Appl. No. 15/193,409, filed Jun. 27, 2016, Trusov et al.
U.S. Non-Final Office Action dated Feb. 2, 2018 for U.S. Appl. No. 15/398,826; 16 Pages.
Office Action dated Nov. 27, 2017 from U.S. Appl. No. 15/186,576; 11 Pages.
Office Action dated Dec. 14, 2017 from U.S. Appl. No. 15/281,172; 9 Pages.
Response to Office Action dated Sep. 15, 2017 from U.S. Appl. No. 15/193,409, filed Dec. 14, 2017; 11 Pages.
Response to Office Action dated Oct. 5, 2017 from U.S. Appl. No. 15/193,407, filed Dec. 20, 2017; 12 Pages.
Response to Office Action dated Oct. 18, 2017 from U.S. Appl. No. 15/193,145, filed Jan. 17, 2018; 12 Pages.
U.S. Appl. No. 15/281,172, filed Sep. 30, 2016, Trusov et al.
U.S. Appl. No. 15/398,832, filed Jan. 5, 2017, Danilov et al.
U.S. Appl. No. 15/398,826, filed Jan. 5, 2017, Danilov et al.
U.S. Appl. No. 15/398,819, filed Jan. 5, 2017, Danilov et al.
Anvin, "The Mathematics of RAID-6;" First Version Jan. 20, 2004; Last Updated Dec. 20, 2011; Retrieved from https://www.kernel.org/pub/linux/kernel/people/hpa/raid6.pdf; 9 Pages.
Blömer et al., "An XOR-Based Erasure-Resilient Coding Scheme;" Article from CiteSeer; Oct. 1999; 19 Pages.
U.S. Non-Final Office Action dated Oct. 5, 2017 for U.S. Appl. No. 15/193,407; 14 pages.
U.S. Non-Final Office Action dated Oct. 18, 2017 for U.S. Appl. No. 15/193,145; 21 pages.
U.S. Non-Final Office Action dated Sep. 15, 2017 for U.S. Appl. No. 15/193,409; 12 pages.
U.S. Notice of Allowance dated May 21, 2018 for U.S. Appl. No. 15/193,142; 9 Pages.
U.S. Non-Final Office Action dated Aug. 15, 2018 for U.S. Appl. No. 15/083,324; 26 Pages.

* cited by examiner

COPYING GARBAGE COLLECTOR FOR B+ TREES UNDER MULTI-VERSION CONCURRENCY CONTROL

CROSS REFERENCE TO RELATED APPLICATIONS

This application claims priority to Russian Application Number 2015153847, filed on Dec. 16, 2015, and entitled "COPYING GARBAGE COLLECTOR FOR B+ TREES UNDER MULTI-VERSION CONCURRENCY CONTROL," which is incorporated herein by reference in its entirety.

BACKGROUND

As is known in the art, multi-version concurrency control (MVCC) is a technique used by databases and storage systems to provide concurrent access to data. With MVCC, each user (e.g., system processes and processes that handle user traffic) sees a snapshot of the data at a particular instant in time. Any changes made by a user will not be seen by other users until the changes are committed. Among other advantages, MVCC provides non-blocking access to a shared resource (e.g., data).

Many storage systems use search trees (e.g., B+ trees) to provide efficient access to stored data. Distributed storage systems (or "clusters") may manage thousands of search trees, each having a very large number (e.g., millions or even billions) of elements. Large search trees are typically stored to disk or other type of non-volatile memory.

To provide MVCC with search trees, a storage system may treat elements of a search tree as immutable. Under MVCC, a search tree may be updated by storing the new/updated data to unused portions of disk, and scheduling a tree update. During a tree update, at least one tree element is updated. In the case of a B+ tree, which includes a root node, internal nodes, and leaves, a tree update requires generating a new leaf to store the data, a new root node, and possibly new internal nodes. These new tree elements may be linked with existing tree elements to form a new search tree. Tree updates result in unused tree elements left on disk and, thus, storage systems typically include a process for detecting and reclaiming unused tree elements (referred to as "garbage collection").

SUMMARY

In some existing storage systems, storage space may partitioned into a set of fixed size blocks (referred to as "storage chunks"), which may store search tree elements. Under MVCC, storage chunks may be appended to, but are otherwise immutable. As a result, garbage collection can only be implemented at the chunk level, and only after it is confirmed that a storage chunk does not contain any referenced (or "live") tree elements.

It is recognized herein that chunk-level garbage collection can lead to fragmentation because even a single live page may prevent a storage chunk from being reclaimed. In some applications, fragmentation may reduce storage usage efficiency to as low as 1%. Accordingly, described herein are systems and processes for garbage collection that reduce (and ideally eliminate) fragmentation. Improved scheduling techniques for a tracing garbage collector are also disclosed.

According to one aspect of the disclosure, a method is provided for use with a distributed storage system comprising a plurality of storage devices. The method may include: identifying a plurality of search trees to traverse, the search trees referencing one or more elements stored within corresponding storage chunks, the storage chunks corresponding to storage capacity within the distributed storage system; traversing the search trees to identify search tree elements stored within under populated storage chunks; copying the identified search tree elements from the under populated storage chunks to different storage chunks; and reclaiming the storage capacity corresponding to the under populated storage chunks.

In some embodiments, the method further includes: receiving data updates to ones of the plurality of search trees in response to data being updated in the distributed storage system; merging the data updates with the identified search tree elements; and processing the merged updates. In certain embodiments, traversing the search trees to identify search tree elements stored within under populated storage chunks comprises comparing the storage chunk capacity to a predetermined threshold. In particular embodiments, copying the identified search tree elements comprises copying a search tree element only if no descendant elements are copied.

In various embodiments, the method further includes: determining a number of unused storage chunks; determining a number of under populated storage chunks; and reclaiming storage capacity for storage chunks based upon the number of unused storage chunks and the number of under populated storage chunks. The search trees can include search trees associated with multiple different replication groups, wherein determining a number of unused storage chunks comprises determining a number of unused storage chunks associated with all search trees associated with the same replication group. Determining a number of under populated storage chunks may include determining a number of under populated storage chunks associated with all search trees associated with the same replication group. Reclaiming storage capacity can include reclaiming storage capacity for storage chunks associated with search trees in the same replication group. Determining a number of under populated storage chunks may include determining a number of under populated storage chunks having an age greater than a predetermined threshold age.

According to another aspect of the disclosure, a distributed storage system includes a plurality of storage devices and two or more storage nodes. The storage nodes may be configured to: identify a plurality of search trees to traverse, the search trees referencing one or more elements stored within corresponding storage chunks, the storage chunks corresponding to storage capacity within the plurality of storage devices; traverse the search trees to identify search tree elements stored within under populated storage chunks; copy the identified search tree elements from the under populated storage chunks to different storage chunks; and reclaim the storage capacity corresponding to the under populated storage chunks.

In some embodiments, the storage nodes are further configured to: receive data updates to ones of the plurality of search trees in response to data being updated in the distributed storage system; merge the data updates with the identified search tree elements; and process the merged updates. In certain embodiments, the storage nodes are configured to identify search tree elements stored within under populated storage chunks by comparing the storage chunk capacity to a predetermined threshold. In particular embodiments, the storage nodes are configured to copy ones of the identified search tree elements only if no descendant elements are copied.

In various embodiments, the storage nodes are further configured to: determine a number of unused storage chunks; determine a number of under populated storage chunks; and reclaim storage capacity for storage chunks based upon the number of unused storage chunks and the number of under populated storage chunks. The storage nodes may include a first pair of storage nodes in a first replication group and second pair of storage nodes in a second replication group, wherein the search trees include search trees associated with multiple different replication groups, and wherein the storage nodes are configured to determine a number of unused storage chunks for all search trees associated with the same replication group. The storage nodes can be configured to determine a number of under populated storage chunks for all search trees associated with the same replication group. The storage nodes may be configured to reclaim storage capacity for storage chunks associated with search trees in the same replication group. The storage nodes can be configured to determine a number of under populated storage chunks having an age greater than a predetermined threshold age.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. As used herein, the phrases "computer," "computing system," "computing environment," "processing platform," "data memory and storage system," and "data memory and storage system environment" are intended to be broadly construed so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

Figure 1:
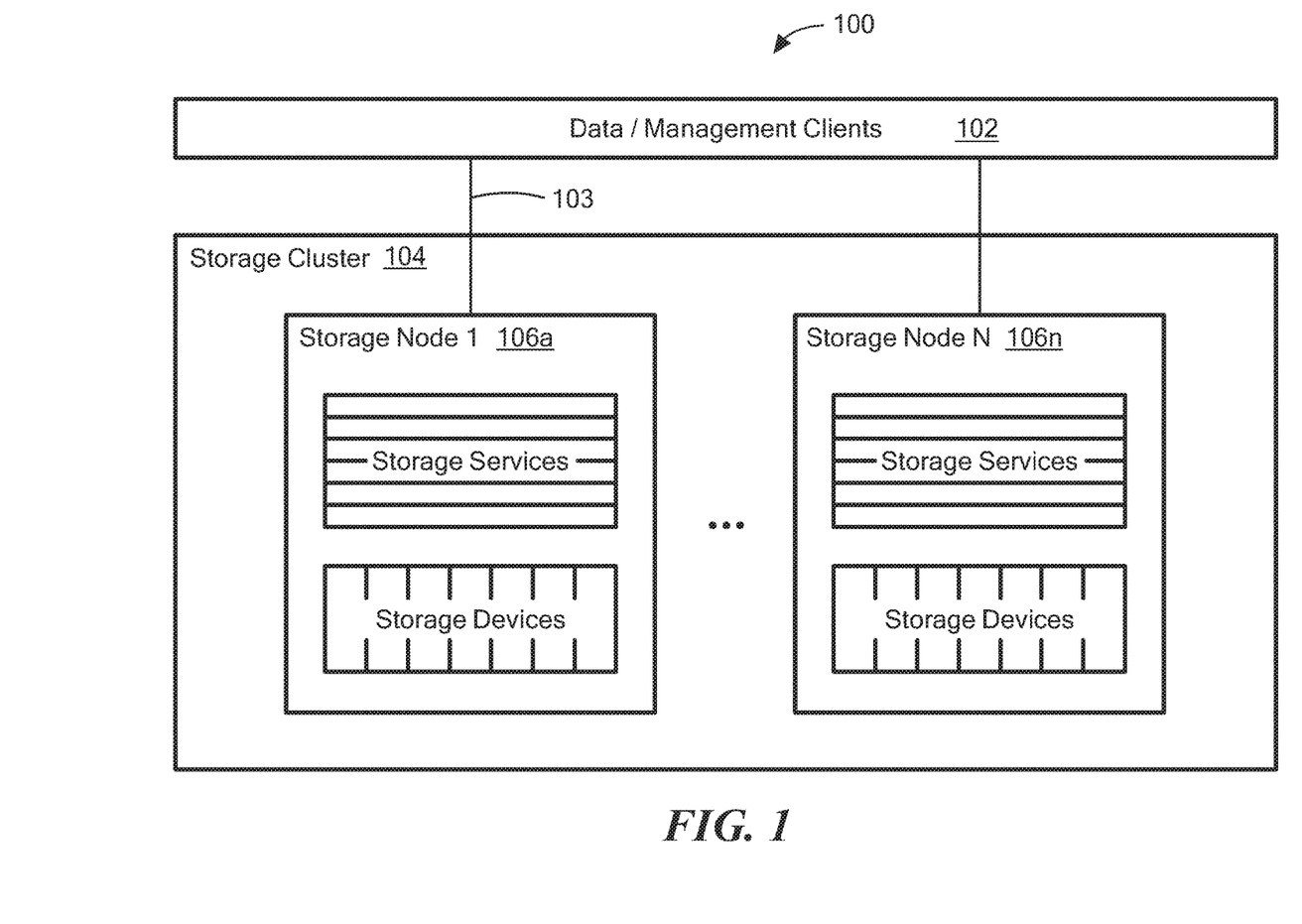
FIG. 1 is a block diagram of an illustrative distributed storage system, in accordance with an embodiment of the disclosure.

FIG. 1 shows a distributed storage system in accordance with an embodiment of the disclosure. An illustrative distributed storage system 100 includes one or more clients 102 in communication with a storage cluster 104 via a network 103. The network 103 may include any suitable type of communication network or combination thereof, including networks using protocols such as Ethernet, Internet Small Computer System Interface (iSCSI), Fibre Channel (FC), and/or wireless protocols. The clients 102 may include user applications, application servers, data management tools, and/or testing systems. The storage cluster 104 includes one or more storage nodes 106a . . . 106n (generally denoted 106). An illustrative storage node is shown in FIG. 1A and described below in conjunction therewith.

In general operation, clients 102 issue requests to the storage cluster 104 to read and write data. Write requests may include requests to store new data and requests to update previously stored data. Data read and write requests include an ID value to uniquely identify the data within the storage cluster 104. A client request may be received by any available storage node 106. The receiving node 106 may process the request locally and/or may delegate request processing to one or more peer nodes 106. For example, if a client issues a data read request, the receiving node may delegate/proxy the request to peer node where the data resides.

In various embodiments, the distributed storage system 100 comprises an object storage system, wherein data is read and written in the form of objects, which are uniquely identified by object IDs. In some embodiments, the storage cluster 104 utilizes Elastic Cloud Storage (ECS) from EMC Corporation of Hopkinton, Mass.

Figure 1A:
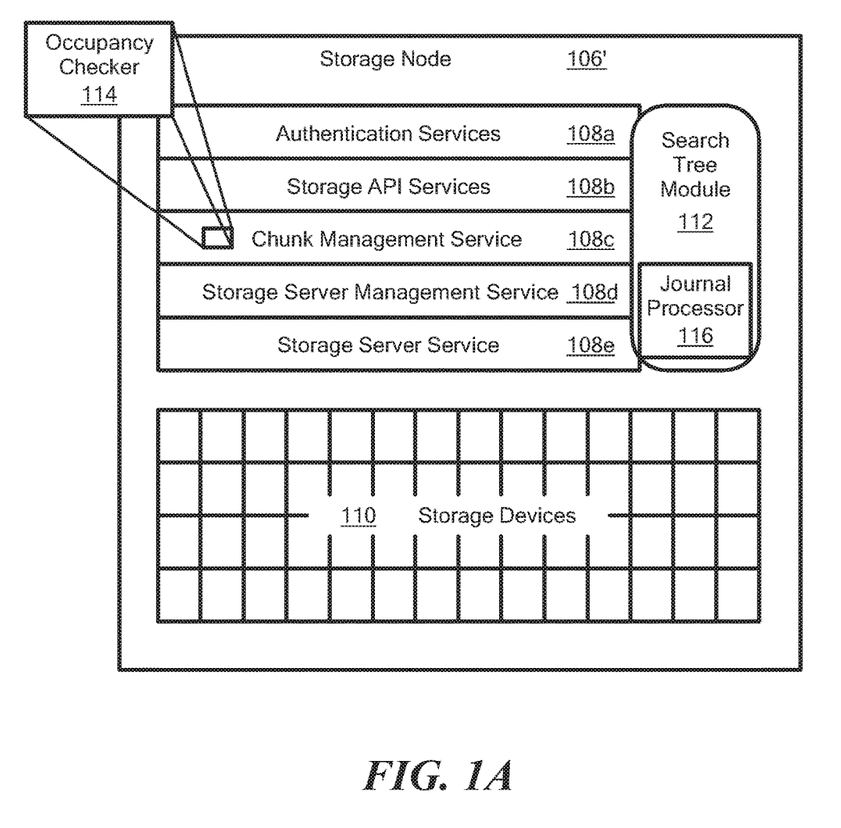
FIG. 1A is a block diagram of an illustrative storage node which may form a part of the distributed storage system of FIG. 1, in accordance with an embodiment of the disclosure.

FIG. 1A shows a storage node 106', which may be the same as or similar to a storage node 106 in FIG. 1, in accordance with an embodiment of the disclosure. The illustrative storage node 106' includes one or more services 108, one or more storage devices 110, and a search tree module 112. A storage node 106' may include a processor (not shown) configured to execute instructions provided by services 108 and/or module 112.

In the example shown, a storage node 106' includes the following services: an authentication service 108a to authenticate requests from clients 102; storage API services 108b to parse and interpret requests from clients 102; a storage chunk management service 108c to facilitate storage chunk allocation/reclamation for different storage system needs and monitor storage chunk health and usage; a storage server management service 108d to manage available storage devices capacity and to track storage devices states; and a storage server service 108e to interface with the storage devices 110.

A storage device 110 may comprise one or more physical and/or logical storage devices attached to the storage node 106a. A storage node 106 may utilize VNX, Symmetrix VMAX, and/or Full Automated Storage Tiering (FAST), which are available from EMC Corporation of Hopkinton, Mass. While vendor-specific terminology may be used to facilitate understanding, it is understood that the concepts, techniques, and structures sought to be protected herein are not limited to use with any specific commercial products.

The search tree module 112 includes hardware and/or software to provide search tree management and operations to the various services 108. In various embodiments, the search tree module 112 is provided as a library that is accessible by services 108. In some embodiments, the search tree module 112 implements a garbage collection (GC) process described below in conjunction with FIGS. 4-6. In addition to reclaiming unused storage, the garbage collector can reduce (and ideally eliminate) fragmentation by copying data between regions of storage while adhering to MVCC semantics.

In certain embodiments, the search tree module 112 may include a journal processor 116 operable to batch tree updates, as discussed below.

In some embodiments, a storage node 106' includes an occupancy checker 114 operable to evaluate the state of storage chunks within the storage devices 110. The occupancy checker may be implemented within the chunk management service 108c, as shown. The occupancy checker 114 may generate output that can be used to schedule garbage collection, as described further below in conjunction with FIG. 6.

Figure 2:
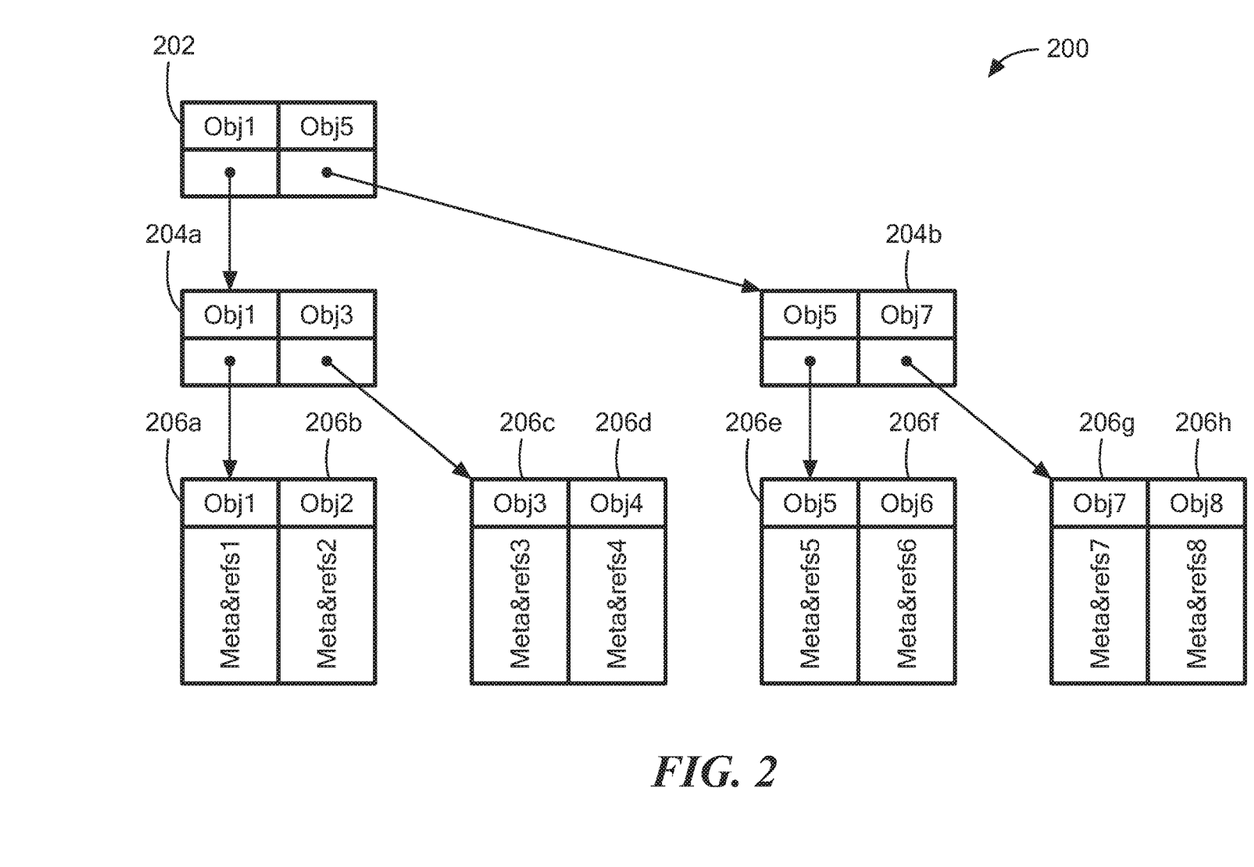
FIG. 2 is a diagram of an illustrative search tree, in accordance with an embodiment of the disclosure.

Referring to FIG. 2, and also with reference to FIGS. 1 and 1A, various storage node services 108 work with so-called "tables" that contain key-value pairs. For example, an object storage system may utilize a so-called "object table" wherein the keys correspond to object IDs and the values correspond to object metadata and object data references. As used herein, the term "object data reference" refers to information about the location of object data within one or more storage devices 110.

A table may be shared across multiple storage nodes 106 (and, in some cases, all storage nodes 106) of a storage cluster 104. Individual storage nodes 106 can maintain a local copy of the table. A given storage node 106 may add/delete/modify a table entries, and then propagate the changes to peer nodes 106. To guarantee data consistency, a table may be owned by one of the storage cluster nodes 106. Non-owner nodes 106 can read from the shared table, however only the owner node can modify it. Table ownership can migrate from one node to another, for example when nodes are added to, or removed from, the storage cluster. The above-described functionality may be provided by the search tree module 112.

To provide efficient access to an arbitrary number key-value pairs, a table may be implemented using a search tree (e.g., a B+ tree) stored to disk.

FIG. 2 shows an example of a search tree in accordance with an embodiment of the disclosure. An illustrative search tree 200 having a root node 202, internal nodes 204 (here, two internal nodes 204a and 204b), and leaves 206 (here, eight leaves 206a-206h). The nodes 202, 204 and leaves 206 are collectively referred to herein as "tree elements" and, in general, a search tree can include an arbitrary number of tree elements.

Each tree element stores one or more key-value pairs. The keys are referred to as "search keys." The type of information stored for a given value depends on the type of tree element. Within a root node 202 and internal nodes 204, values are references to other nodes 204 or to leaves 206. For example, as shown, internal node 204a includes two key-value pairs: search key "Obj1" references leaf 206a and search key "Obj3" references leaf 206c. Within leaves 206, values correspond to the actual data stored by the search tree. In the case of an Object Tree, the search keys may correspond to object IDs and the leaf values correspond to object metadata and object data references. For example, leaf 206a stores metadata for object ID "Obj1" in addition to the location of that object's data on disk.

It should be understood that search tree 200 is merely illustrative and that a typical search tree may include millions or even billions of tree elements.

Figure 3A:
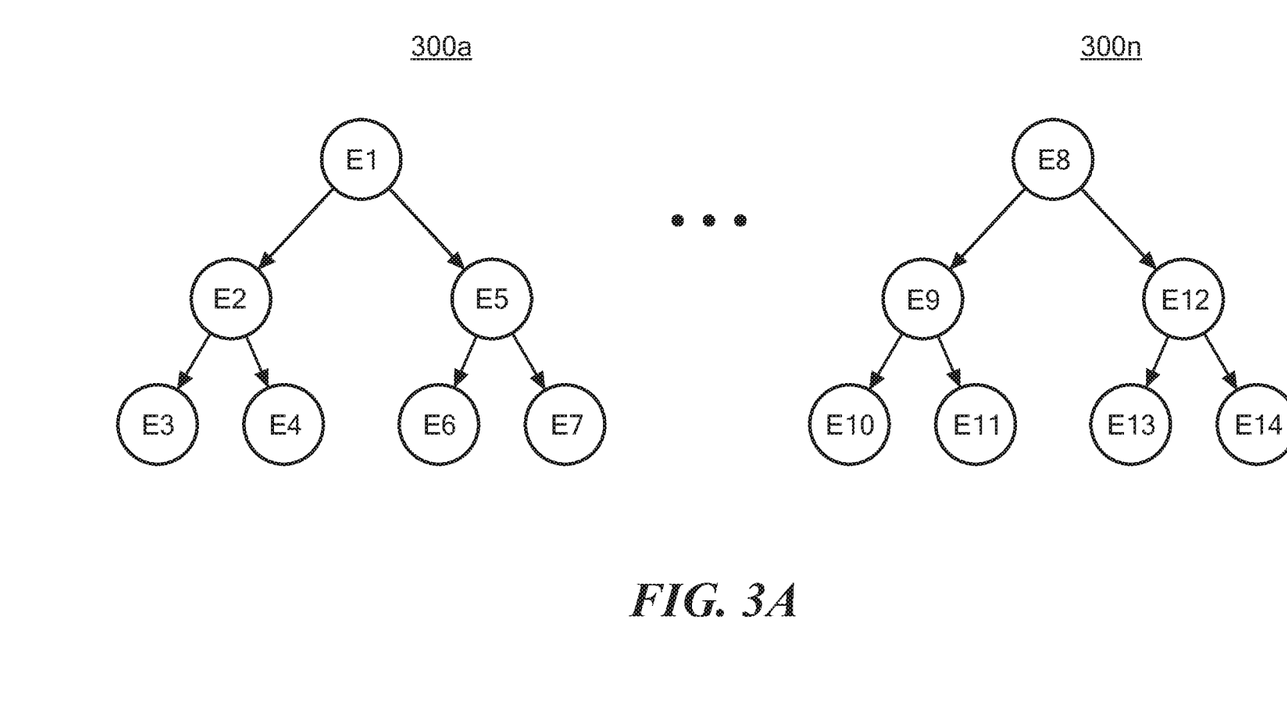
FIGS. 3A and 3B are diagrams showing how search trees may be stored on disk, in accordance with an embodiment of the disclosure.
Figure 3B:
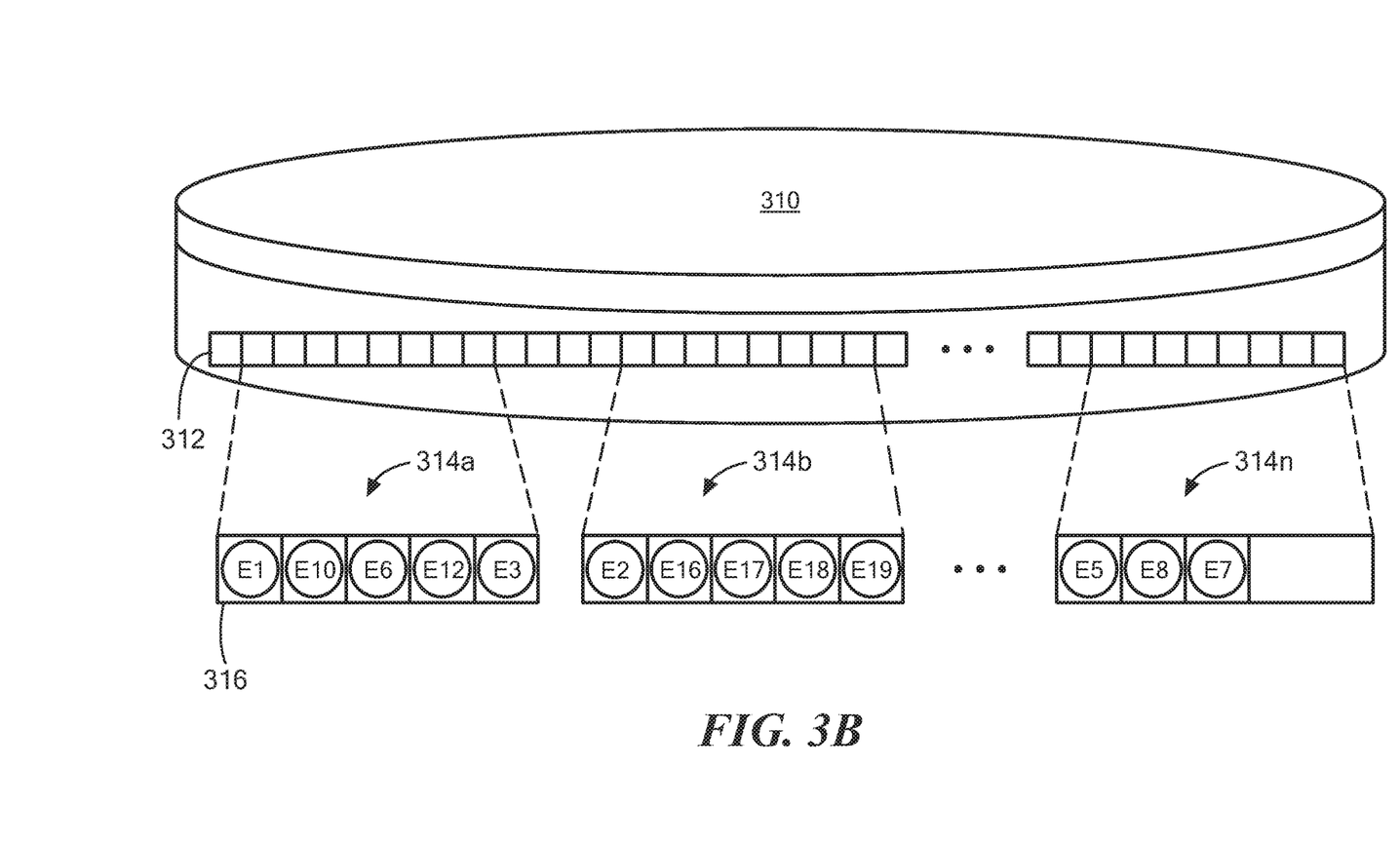

FIGS. 3A and 3B, together, illustrate how search trees may be stored within block storage devices, such as storage devices 110 of FIG. 1A, according to an embodiment of the disclosure.

Referring to FIG. 3A, an arbitrary number of search trees 300a . . . 300n (generally denoted 300) may be stored, with each search tree 300 having an arbitrary number of elements. In this example, a first search tree 300a includes elements E1-E7 and a second search tree 300b includes elements E8-E14, as shown.

Referring to FIG. 3B, and also with reference to FIG. 3A, search trees 300 can be stored within a block storage device 310, such as a hard disk. The block storage device 310 provides read and write access to fixed-size blocks 312. The block storage device 310 can be partitioned into a plurality of storage chunks 314a . . . 314n (generally denoted 314), wherein each storage chunk 314 corresponds to a fixed number of contiguous blocks 312. In the example shown, each storage chunk 314 corresponds to eight (8) contiguous blocks 312. In practice, a storage chunk 314 may correspond to more than eight (8) blocks 312.

Each element of a search tree 300 is stored within a page 316. As used herein, a "page" refers to a continuous portion of a storage chunk 314. The size of a page may vary depending on the data stored by the respective tree element. In various embodiments, each page 316 contains exactly one tree element.

A given storage chunk 314 may include elements from different search trees. For example, illustrative storage chunk 314a is show having elements E1, E6, and E3 from the first search tree 300a and elements E10 and E12 from the second search tree 300n. A storage chunk 314 may also include unreferenced (also referred to as "orphan" or "dead") tree elements, i.e., tree elements that are no longer referenced by any search tree 300 of interest to the storage system. For example, as shown, storage chunk 314b includes unreferenced tree elements E16, E17, E18, and E19.

To provide multi-version concurrency control (MVCC), elements of a search tree 300 are treated as immutable. Accordingly, all pages 316 (which contain tree elements) are also treated as immutable. Storage chunks 314 can be modified only by appending pages 316. When a storage chunk 314 becomes full (e.g., when there insufficient space to add a page 316), it is marked as "sealed." A sealed storage chunk 314 is treated as immutable.

If a user changes data stored by a search tree 300, new pages 316 are allocated for the corresponding tree elements that are modified. In the case of a B+ search tree, new pages 316 are allocated for: (1) a new leaf for the new/modified user data; (2) a new root node; and (3) at least N−2 internal nodes, where N is the current depth of the search tree. The new root node and internal nodes are configured to provide a search path to the new leaf. Thus, a search tree update results in the creation of a new tree that may share elements with the previous tree. A search tree update also results in unreferenced tree elements and wasted storage capacity allocated for the corresponding pages 316. It is desirable to reclaim this unused page storage.

Because sealed storage chunks 314 are treated as immutable, reclamation of unused storage can only occur at the storage chunk level, not at the page level. Thus, even a single referenced page can prevent a storage chunk from being reclaimed, resulting in disk fragmentation. For example, in the example of FIG. 3B, even though the illustrative storage chunk 314*b* contains four unreferenced pages (i.e., the pages storing elements E16-E19) and only one referenced page (i.e., the page storing element E2), its storage capacity cannot be reclaimed. A technique to reduce fragmentation is described below in conjunction with FIGS. 4-6.

It will be appreciated that search tree updates can be expensive in terms of I/O overhead. To reduce this overhead, tree updates may be performed in bulk (i.e., "batched"). In some embodiments, each search tree 300 has an associated journal of data updates. A journal may be limited in size. When a journal becomes full, a journal processor 116 performs bulk tree updates in order to minimize the total cost of the update. The journal processor may be executed on a storage node 106 that owns the search tree. Journal updates should be as fast as possible to reduce impact on users.

A distributed storage system may include several different types of tables implemented as search trees 300. For example, an object table may be provided to maintain information about stored objects. As another example, a chunk table may be provided to keep track of storage chunks.

Figure 3C:
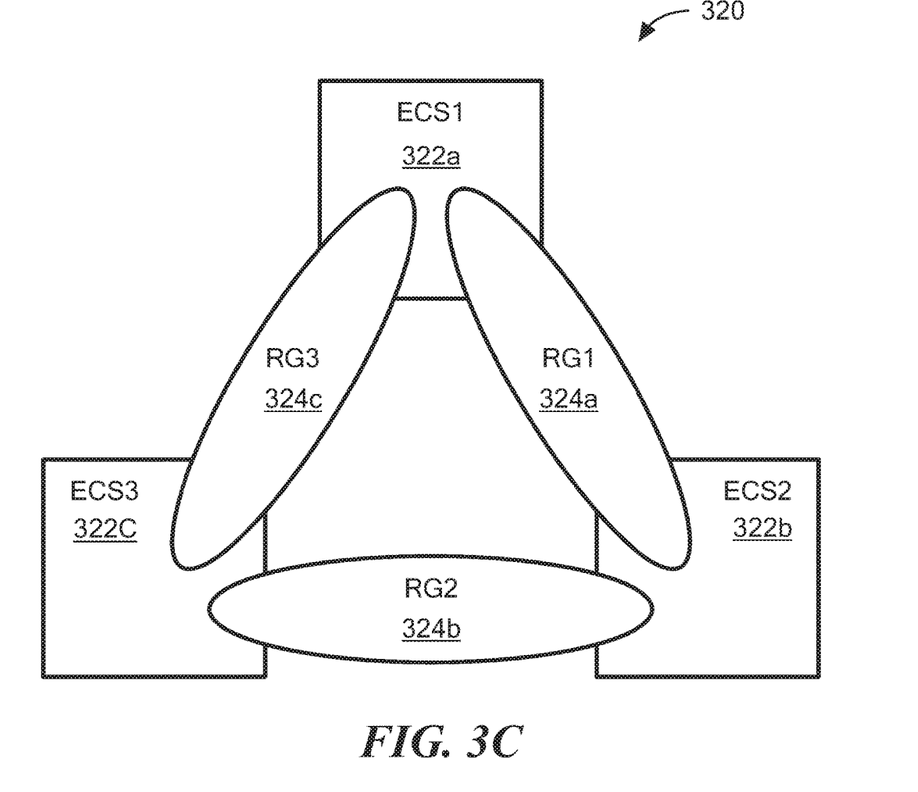
FIG. 3C is a block diagram of an illustrative distributed storage system comprising multiple clusters and multiple replication groups, in accordance with an embodiment of the disclosure.

Referring to FIG. 3C, an illustrative distributed storage system 320 comprises a plurality of clusters 322 (with three clusters 322*a*-322*c* shown in this example), each of which includes a plurality of storage nodes 106 (FIG. 1) that may be collocated. The system 320 also includes a plurality of replication groups 324 (with three replication groups 324*a*-324*c* shown in this example). A replication group 324 is a logical construct that defines where particular content (e.g., an object) are is replicated within the system 320 and can protect against disk, node, and site failures. A replication group 324 may be hosted by one or more clusters 322. For example, as shown, replication group 324*a* is hosted by both cluster 322*a* and cluster 322*b*.

Each cluster 322 maintains a complete set of tables (including tables of different types) for each replication group 324 it hosts. Each table (and thus each implementing search tree 300) may be assigned to a particular replication group 324. To facilitate chunk-level replication, a given storage chunk 314 cannot include elements from search trees in different replication groups 324. Storage chunks can be shared by search trees 300 of different types, so long as the search trees belong to the same replication group. This restriction can be used to improve garbage collection scheduling, as described below in conjunction with FIG. 6.

Figure 4:
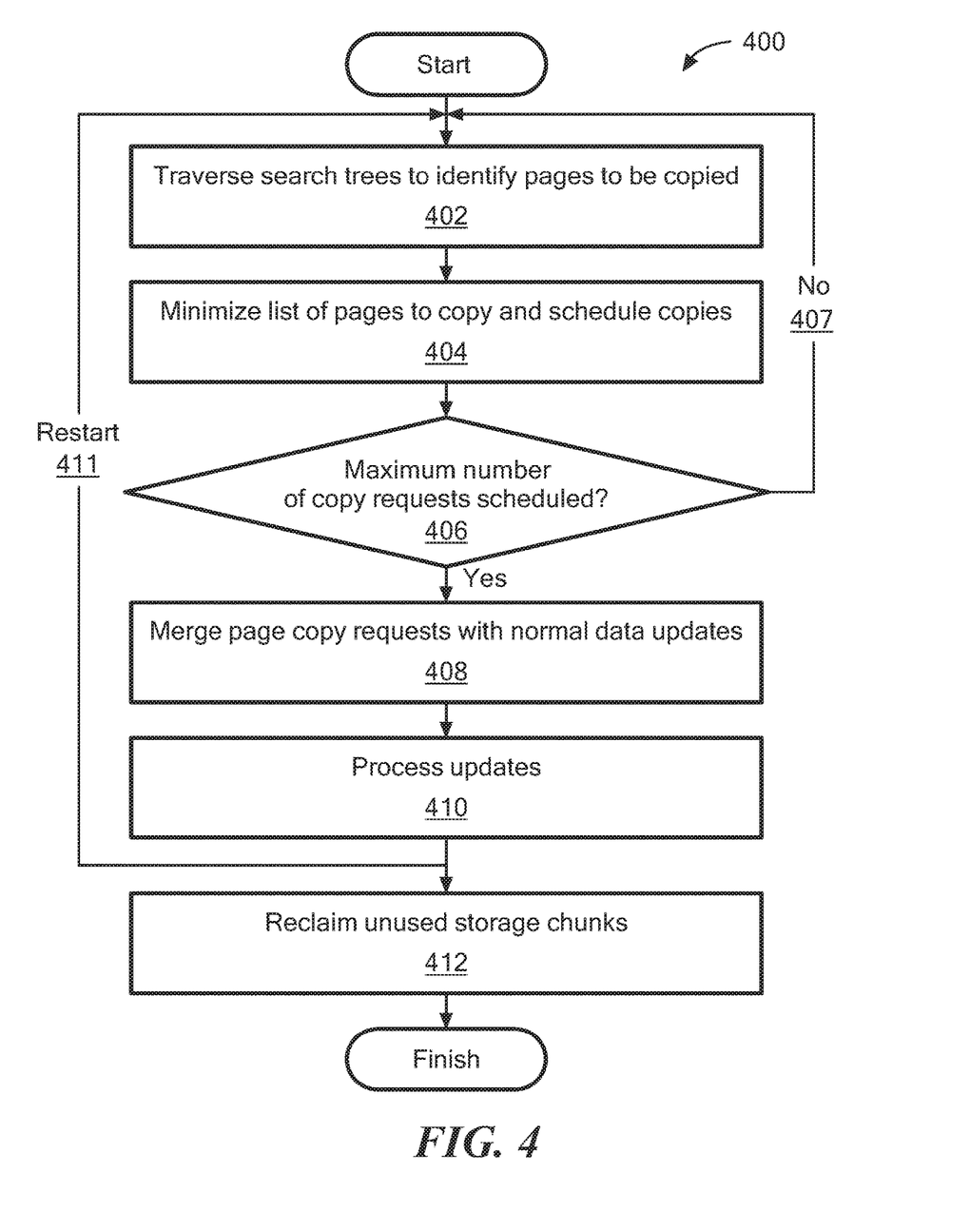
FIG. 4 is a flow diagram showing an illustrative process that may be used within the distributed storage system of FIG. 1, in accordance with an embodiment of the disclosure.
Figure 6:
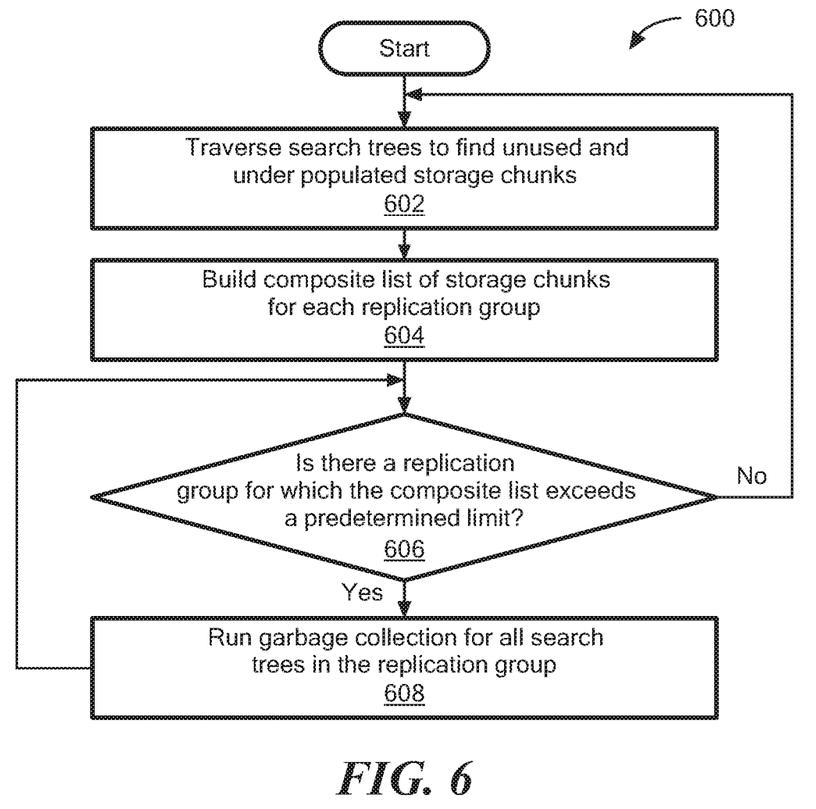
FIG. 6 is a flow diagram showing an illustrative process that may be used within the distributed storage system of FIG. 1, in accordance with an embodiment of the disclosure.

FIGS. 4 and 6 are flow diagrams showing illustrative processing in accordance with certain embodiments of the disclosure. The processing can be implemented within one or more storage nodes 106 of a storage cluster 104 (FIG. 1). Rectangular elements (typified by element 402 of FIG. 4) herein denoted "processing blocks," represent computer software instructions or groups of instructions. Diamond shaped elements (typified by element 606 of FIG. 6) herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 4, according to some embodiments of the disclosure, a so-called "copying" garbage collector can reduce fragmentation by copying referenced pages out of storage chunks that are under populated, thereby allowing the corresponding chunk storage capacity reclaimed. As used herein the term "under populated" refers to storage chunks for which the percentage of storage capacity currently being used (e.g., used to store referenced search tree elements) is less than some predetermined threshold. In some embodiments, the threshold is between 20-25% of the total storage chunk capacity.

FIG. 4 shows a process 400 for use in a copying garbage collector, according to some embodiments of the disclosure. At block 402, the garbage collector traverses one or more search trees to identify pages to be copied. When determining if a page should be copied between storage chunks, the garbage collector may check whether the storage chunk in which the page currently resides is sealed: only sealed storage chunks can be reclaimed under MVCC. In addition, the garbage collector may check whether the page's currently storage chunk is under populated, thereby preventing the page from being copied between "almost full" storage chunks over and over again. The garbage collector may use a predetermined threshold (e.g., 20%) to determine if a storage chunk is under populated. In some embodiments, the garbage collector performs a depth-first traversal of the search tree to identify the pages to be copied.

During the traversal 402, the garbage collector may generate a list of tree elements (or, equivalently, pages) to be copied. It will be appreciated there is a cost (in terms of processing and I/O) associated with copying each page. Therefore, in some embodiments, the garbage collector seeks to minimize the size of the copy list while still achieving the goal of reducing disk fragmentation.

At block 404, the garbage collector may reduce the size of the copy list by taking advantage of the fact that search trees may be implemented as B+ trees. In particular, because updating any element of a B+ tree causes all its ancestors to be updated, a page can be excluded from the copy list of it has any descendants in the list. Leafs, which have no descendants, can be treated as a special case and added to the copy list without further consideration.

Figure 5:
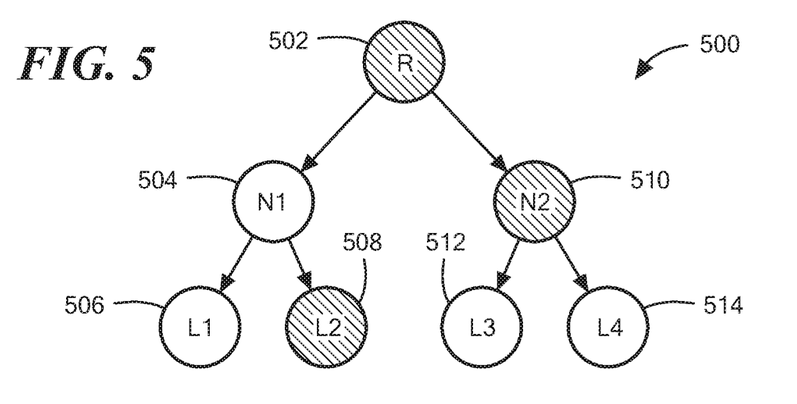
FIG. 5 is a diagram of an illustrative search tree, in accordance with an embodiment of the disclosure.

The aforementioned technique for generating the copy list may be better understood by example. FIG. 5 shows an illustrative search tree 500 having a root node 502 ("R"), internal nodes 504 and 510 ("N1" and "N2"), and leaves 506, 508, 512, and 514 ("L1", "L2", "L3," and "L4"). Here, it is assumed the garbage collector traverses the nodes in a depth-first manner, starting at root node 502. The elements shown in the figure using hatching (i.e., elements 502, 508, and 510) are assumed to reside in storage chunks that are sealed and under populated.

TABLE 1 shows decisions that may be made at each step when traversing the search tree 500.

TABLE 1

|        | 502 (R) | 504 (N1) | 506 (L1) | 508 (L2) | 510 (N2) | 512 (L3) | 514 (L4) |
|--------|---------|----------|----------|----------|----------|----------|----------|
| Step 1 | ?       |          |          |          |          |          |          |
| Step 2 | ?       | X        |          |          |          |          |          |
| Step 3 | ?       | X        | X        |          |          |          |          |
| Step 4 | X       | X        | X        | C        |          |          |          |
| Step 5 | X       | X        | X        | C        | ?        |          |          |
| Step 6 | X       | X        | X        | C        | ?        | X        |          |
| Step 7 | X       | X        | X        | C        | C        | X        | X        |

At step 1, the garbage collector visits node 502 and determines that the corresponding page should be copied. Because the root node 502 has descendants, it is not immediately added to the copy list. Instead, root node 501 is considered as merely a candidate for the copy list, as indicated by question mark "?" in TABLE 1.

At steps 2 and 3, the garbage collector visits elements 504 and 506, respectively, and determines that neither should be copied, as indicated by an "X" in TABLE 1.

At step 4, the garbage collector visits leaf 508 and determines that the corresponding page should be copied. Having no descendants, element 508 can be immediately added to the copy list, as indicated by a "C" in TABLE 1. Root node 502 can be eliminated as a candidate when its descendant 508 is added to the copy list.

At step 5, the garbage collector visits internal node 510 and determines that its page should be copied. Because internal node 510 has descendants, it is considered a candidate for the copy list at this point.

At steps 6 and 7, the garbage collector visit leaves 512 and 514, respectively, and determines that the corresponding pages should not be copied. At this point, candidate element 510 can be added to the copy list because it has no descendants in the list.

In this example, after the illustrative search tree 500 has been traversed, the copy list includes elements 508 and 510. Root node 502 will be copied automatically.

Referring again to FIG. 4, the output of blocks 402, 404 may include the copy list. In some embodiments, the garbage collector detects unused chunks during traversal 402 and, thus, the output may also include a list of unused chunks as garbage collection candidates.

In some embodiments, the actual copying of pages is performed by the journal processor 116 (FIG. 1A). In particular, the journal associated with a given search tree may include a list of copy requests maintained separate from normal data requests. Thus, blocks 402, 404 may include generating tree journal copy requests.

At block 406, in some embodiments, the tree journal limits the number of pending copy requests and forces journal processing to commence when the limit is reached. At this point, processing proceeds to the so-called "copy phase," indicated by blocks 408, 410.

At block 408, the journal process may merge its list of copy requests with its normal data updates to avoid duplicate effort. For example, copy requests for updated pages can be discarded, as can copy requests for pages that become unreferenced as a result of a tree update.

At block 410, the journal updates may be processed, resulting in the desired pages being copied. In particular, each page indicated by the copy list will be copied from its under populated (sealed) storage chunk into a different (unsealed) storage chunk. After all referenced pages have been copied out of a sealed chunk, its storage capacity can be reclaimed by the garbage collector.

In some embodiments, the detect phase 402, 404 is implemented within a garbage collector process and the copy phase 408, 410 are implemented within a journal processor. When the journal becomes full of copy requests (block 406), the journal processor may preempt the garbage collector's tree traversal. Thus, it may be necessary to restart the traversal, as indicated by line 411. If the garbage collector completes the detect phase, journal processing may be forced to start (even if not full of copy/update requests) to increase the storage capacity reclaimed by the subsequent reclaim phase 406. Alternatively, the garbage collector may proceed to traverse other search trees, as indicated by line 407. In certain embodiments, the detect phase 402, 404 is implemented within an occupancy checker 114 (FIG. 1A).

At block 412, unused storage chunks (i.e., storage chunks that are sealed and that have no referenced pages) may be reclaimed using any suitable technique. For example, a tracing technique may be used whereby the garbage collector visits each element of the search tree to identify storage chunks that have no referenced pages. The reclaimed chunks may include unused storage chunks identified during the detect phase, as well as under populated storage chunks that have become unused as a result of the copy phase.

Referring to FIG. 6, in some embodiments, the copying garbage collector includes a scheduler function that determines (1) when garbage collection should run and (2) which search trees should be processed during garbage collection. In general, the goal is to maintain an acceptable balance between the benefits of garbage collection (i.e., reclaimed storage capacity) and the costs of running garbage collection (e.g., increased processing and I/O load).

FIG. 6 shows an process for scheduling garbage collection, according to an embodiment of the disclosure. The illustrative process 600 addresses two scheduling issues: (1) when should garbage collection run; and (2) which search trees should be processed during a given garbage collection run.

To determine when garbage collection should run, a scheduler may take into account the state of existing storage chunks. This state may be continually (or periodically) evaluated by a storage node's occupancy checker 114 (FIG. 1A), as indicated by block 602. The occupancy checker 114 scans the reference tables that contain information about capacity actually used by each storage chunk. Here, the task of the occupancy checker is to find (a) potential garbage (i.e. storage chunks with zero used capacity) and (b) under populated storage chunks that can be offloaded by copying referenced pages.

At block 604, when an unused or under populated storage chunk is detected, it may be added a list of garbage collection candidates. It should be understood that, due to the distributed nature of the object storage system, it is generally not safe to immediately reclaim the storage capacity used by these storage chunks (at least not until all referenced search tree elements have been visited). However for the purpose of scheduling it can be useful to count these chunks as garbage.

As discussed above in conjunction with FIG. 4, quantitative techniques can be used to determine when a storage chunk is "under populated." From a storage capacity utilization perspective, it may be desirable to copy referenced pages from all storage chunks not at 100% capacity. On the other hand, from a system load perspective, the garbage collector should run as infrequently as possible. To manage this tradeoff, so-called "chunk capacity efficiency" threshold may be selected. For the purpose of garbage collection, a chunk that has capacity below this threshold is considered under populated and may be counted (block 604).

The chunk capacity efficiency threshold may be selected based upon various factors, including the costs associated with copying pages and the capacity available to store search trees. The capacity required to store a search tree may be calculated as $$\text{capacity\_required} = \frac{\text{tree\_size}}{\text{chunk\_capacity\_efficiency\_threshold}}.$$

Thus, a lower threshold value results in lower costs associated with copying pages but higher capacity requirements, and vice versa. In some embodiments, the chunk capacity efficiency is selected to be about 20%. Here, a fivefold storage capacity may be reserved for a search tree.

In some embodiments, the scheduler also considers the age of storage chunks when counting garbage candidates. In particular, at block 604, the scheduler may only count an under populated storage chunk as a garbage candidate if its age is greater than some predetermined threshold age. This gives storage chunks a chance to become unused naturally as a result of normal tree updates, thereby preventing unnecessary copies.

The scheduler may generate a composite list of unused and under populated storage chunks. The size of the composite list serves as a de facto reference count suitable for scheduling garbage collection. At block 606, when the size of the composite list exceeds a predetermined limit, garbage collection may commence.

As discussed above in conjunction with FIGS. 3A and 3B, a storage chunk may store elements from two different search trees, so long as they are in the same replication group 324. This allows the scheduler to perform reference counting at the replication group level. In particular, at block 604, the scheduler may maintain separate composite list of chunks for each tree replication group and, at block 606, commence garbage collection when the aggregate garbage count within a given replication group exceeds some limit.

Likewise, at block 608, the scheduler can use replication groups to determine which search trees should be processed during garbage collection. In some embodiments, all search trees within a replication group are processed. When the scheduler determines that garbage collection should run for a set of search trees, it may initiate a garbage collection process on the particular storage node 106 (FIG. 1) that currently owns the tree. Thus, the garbage collection may proceed in a distributed fashion.

It should be appreciated that portions of the copying garbage collection process 400 of FIG. 4 and the scheduling process 600 of FIG. 6 may be combined in whole or in part to provide a combined garbage collection process. Some of the steps can be combined and/or performed in parallel. For example, in some embodiments, the occupancy checker 114 can traverse search trees to identify pages to be copied (block 402 of FIG. 4) and also to count garbage chunks for scheduling (block 602 of FIG. 6).

Figure 7:
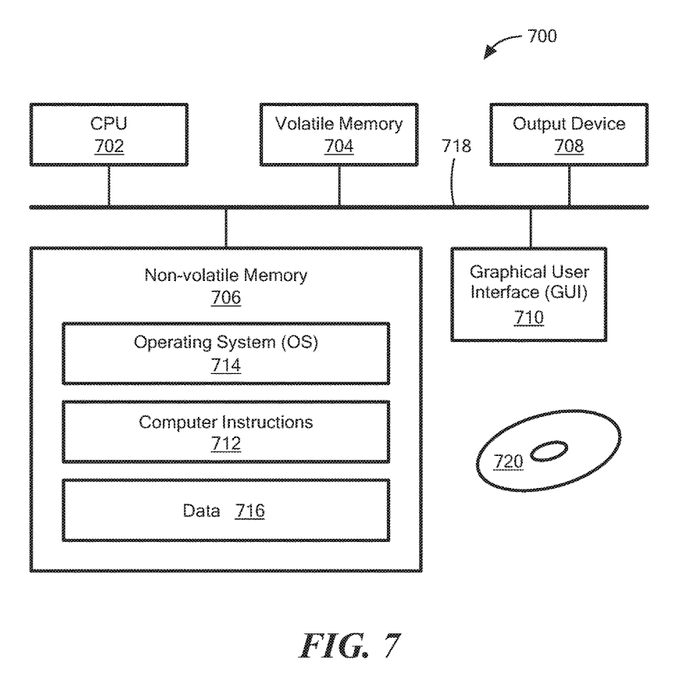
FIG. 7 is a schematic representation of an illustrative computer for use with the systems of FIGS. 1 and 2, in accordance with an embodiment of the disclosure.

FIG. 7 shows an illustrative computer or other processing device 700 that can perform at least part of the processing described herein, according to an embodiment of the disclosure. The computer 700 includes a processor 702, a volatile memory 704, a non-volatile memory 706 (e.g., hard disk), an output device 708 and a graphical user interface (GUI) 710 (e.g., a mouse, a keyboard, a display, for example), each of which is coupled together by a bus 718. The non-volatile memory 706 stores computer instructions 712, an operating system 714, and data 716. In one example, the computer instructions 712 are executed by the processor 702 out of volatile memory 704. In one embodiment, an article 720 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

The invention claimed is:

1. A method for use with a distributed storage system comprising a plurality of storage devices, the method comprising:
   traversing a plurality of search trees to identify one or more elements stored in underpopulated storage chunks of the distributed storage system;
   generating a plurality of copy requests corresponding to the identified elements, each of the copy requests corresponding to a different respective one of the identified elements;
   merging the plurality of copy requests with one or more co-pending data update requests, the merging including discarding a copy request from the plurality of copy requests in response to detecting that the copy request corresponds to an element that is due to be modified by one of the co-pending data update requests;
   executing any remaining, copy requests in the plurality of copy requests by copying respective ones of the identified elements that correspond to the remaining copy requests from the underpopulated storage chunks to different storage chunks; and
   reclaiming storage capacity corresponding to the underpopulated storage chunks.

2. The method of claim 1 wherein modifying the element by one of the co-pending data update requests includes at least one of updating the element and dereferencing the element.

3. The method of claim 1 wherein traversing the plurality of search trees to identify one or more elements in underpopulated storage chunks comprises detecting whether any storage chunk in the distributed storage system is underpopulated based on whether a capacity of the storage chunk meets a predetermined threshold.

4. The method of claim 1, wherein the traversing of the plurality of search trees is interrupted when a predetermined number of elements stored in underpopulated storage chunks have been identified.

5. The method of claim 1 further comprising:
   determining a number of unused storage chunks;
   determining a number of underpopulated storage chunks; and
   wherein the storage capacity corresponding to the underpopulated storage chunks is reclaimed based upon the number of unused storage chunks and the number of underpopulated storage chunks.

6. The method of claim 5 wherein the search trees include search trees associated with multiple different replication groups, wherein determining a number of unused storage chunks comprises determining a number of unused storage chunks associated with all search trees associated with the same replication group.

7. The method of claim 6 wherein determining a number of underpopulated storage chunks comprises determining a number of underpopulated storage chunks associated with all search trees associated with the same replication group.

8. The method of claim 6 wherein reclaiming storage capacity comprises reclaiming storage capacity for storage chunks associated with search trees in the same replication group.

9. The method of claim 5 wherein determining a number of underpopulated storage chunks comprises determining a number of underpopulated storage chunks having an age greater than a predetermined threshold age.

10. A distributed storage system comprising:
    a plurality of storage devices;
    two or more storage nodes configured to:
    traverse a plurality of search trees to identify one or more elements stored in underpopulated storage chunks of the distributed storage system;
    generate a plurality of copy requests corresponding to the identified elements, each of the copy requests corresponding to a different respective one of the identified elements;
    merge the plurality of copy requests with one or more co-pending data update requests by discarding a copy request from the plurality of copy requests in response to detecting that the copy request corresponds to an element that is due to be modified by one of the co-pending data update requests;
    execute any remaining copy requests in the plurality of copy requests by copying respective ones of the identified elements that correspond to the remaining copy requests from the underpopulated storage chunks to different storage chunks; and
    reclaim storage capacity corresponding to the underpopulated storage chunks.

11. The system of claim 10 wherein modifying the element by one of the co-pending data update requests includes at least one of updating the element and dereferencing the element.

12. The system of claim 10 wherein traversing the plurality of search trees to identify elements stored within underpopulated storage chunks include detecting whether any storage chunk in the distributed storage system is underpopulated based on whether a capacity of the storage chunk meets a predetermined threshold.

13. The system of claim 10 wherein the traversal of the plurality of search trees is interrupted when a predetermined number of elements stored in underpopulated storage chunks have been identified.

14. The system of claim 10 wherein the storage nodes are further configured to:
    determine a number of unused storage chunks;
    determine a number of underpopulated storage chunks; and
    wherein the storage capacity corresponding to the underpopulated storage chunks is reclaimed based upon the number of unused storage chunks and the number of underpopulated storage chunks.

15. The system of claim 14 wherein the storage nodes include a first pair of storage nodes in a first replication group and second pair of storage nodes in a second replication group, wherein the search trees include search trees associated with multiple different replication groups, and wherein the storage nodes are configured to determine a number of unused storage chunks for all search trees associated with the same replication group.

16. The system of claim 15 wherein the storage nodes are configured to determine a number of underpopulated storage chunks for all search trees associated with the same replication group.

17. The system of claim 15 wherein the storage nodes are configured to reclaim storage capacity for storage chunks associated with search trees in the same replication group.

18. The system of claim 14 wherein the storage nodes are configured to determine a number of underpopulated storage chunks having an age greater than a predetermined threshold age.

* * * * *